US009372931B2

(12) United States Patent
Capt et al.

(10) Patent No.: US 9,372,931 B2
(45) Date of Patent: Jun. 21, 2016

(54) SIMULATING DYNAMIC CONTENT BASED ON A LOCATION

(71) Applicant: Adobe Systems Incorporated, San Jose, CA (US)

(72) Inventors: Alexandre Capt, Landser (FR); David Nuescheler, Grellingen (CH)

(73) Assignee: Adobe Systems Incorporated, San Jose, CA (US)

( * ) Notice: Subject to any disclaimer, the term of this patent is extended or adjusted under 35 U.S.C. 154(b) by 575 days.

(21) Appl. No.: 13/648,847

(22) Filed: Oct. 10, 2012

(65) Prior Publication Data
US 2014/0101531 A1 Apr. 10, 2014

(51) Int. Cl.
*G06F 17/00* (2006.01)
*G06F 17/30* (2006.01)

(52) U.S. Cl.
CPC ........ *G06F 17/3087* (2013.01); *G06F 17/3089* (2013.01); *G06F 17/30867* (2013.01)

(58) Field of Classification Search
CPC .......... G06F 17/3089; G06F 17/30867; G06F 17/2235
USPC ....................................................... 715/234
See application file for complete search history.

(56) References Cited

U.S. PATENT DOCUMENTS 6,684,369 B1 * 1/2004 Bernardo et al. ............. 715/205
7,475,060 B2 * 1/2009 Toyama ............ G06F 17/30241

OTHER PUBLICATIONS

Hristova et al., "Ad-me: Wireless Advertising Adapted to the User Location, Device, and Emotions," 37th Hawaii International Conference on System Sciences, IEEE, 2004,pp. 1-10.*
"Building and evaluating a location-based service recommendation system with a preference adjustment mechanism," Kuo et al., 2009, Elsevier, p. 3543-3554.*

* cited by examiner

*Primary Examiner* — Andrew McIntosh
(74) *Attorney, Agent, or Firm* — Kilpatrick Townsend & Stockton LLP

(57) ABSTRACT

One exemplary embodiment involves simulating personalized content included on a web page based on user characteristics comprising at least a geographic location. The embodiment involves receiving a plurality of user characteristics comprising at least the geographic location and determining, based on the user characteristics, the personalized content to include on the web page. The embodiment further involves causing one or more actions to dynamically refresh the web page to include the determined personalized content.

17 Claims, 6 Drawing Sheets

SIMULATING DYNAMIC CONTENT BASED ON A LOCATION

FIELD

This disclosure relates generally to computer software and more particularly relates to the creation, modification, use, and distribution of electronic content.

BACKGROUND

A web site hosted by a web server provides one or more web pages to requesting users over a network. The web pages may include a variety of content such as advertisements, media, text, and/or other types of electronic content. An author of the web site may provide the content to be included in the web pages. For example, the author accesses a web server hosting the web site to provide the content and/or otherwise define the web pages of the web site. Additionally, the content included in the web page may be personalized based on a variety of factors. For example, the content of a web page may be personalized based on a user accessing the web page. The web page may include content personalized specifically for the user such as advertisements, media, news, and/or other electronic content targeted for the user. A user may request to access the web site from a client device by manipulating one or more user interfaces rendered on a display associated with the client device. In response, the client device may receive web pages that include personalized content specifically for the requesting user.

SUMMARY

Disclosed are embodiments a plurality of user characteristics comprising at least a geographic location for simulating personalized content to include in a web page. The embodiment also involves determining, based at least in part on the user characteristics, the personalized content to include in the web page. Additionally, the embodiment involves causing one or more actions to dynamically render the web page that includes the personalized content.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
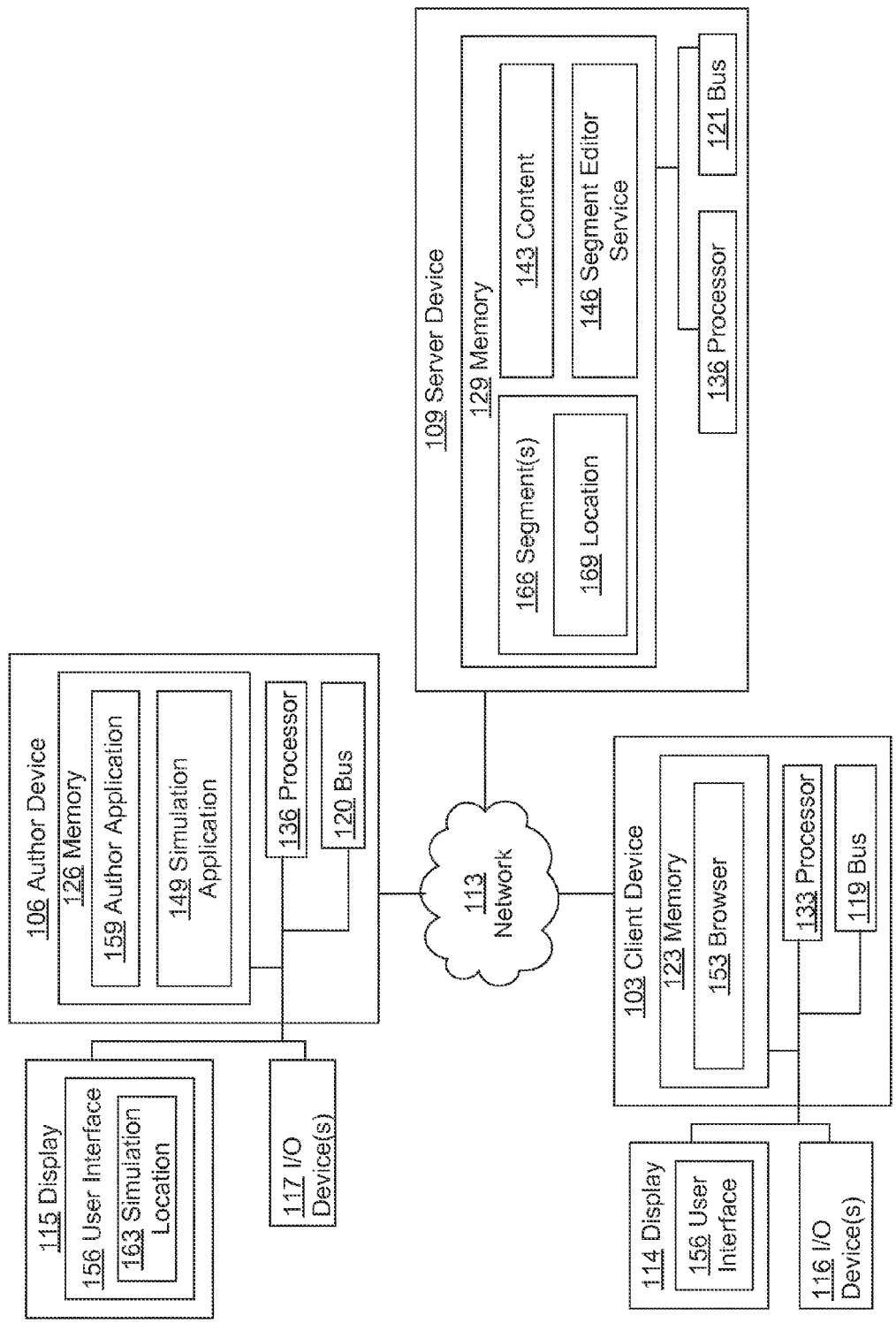
FIG. 1 is a block diagram depicting exemplary computing devices in an exemplary computing environment for implementing certain embodiments.

Disclosed are embodiments for simulating dynamic content based on a geographic location. In one embodiment, an author of a web site may provide personalized content on one or more web pages to end users. For example, the end users may be customers having a variety of interests, purchasing histories, consuming patterns, and/or other user specific characteristics. The content included on the web pages presented to the end user may be personalized based at least in part on the user specific characteristics. Additionally, the content may be personalized based on a geographic location of the end user. For example, a geographic location of the client device from which the end user accesses the web pages may determine the content that is included on the web pages. In one embodiment, a web service on a web server device providing the web pages also provides a variety of personalized content in conjunction with the web pages based at least in part on the geographic location of the client device. In another embodiment, a browser and/or other client side application being implemented on the client device may determine the geographic location of the client device. The browser may then determine which of the personalized content to include on the web page based on the determined location.

An author of the web site may draw associations between the content to include in the web page for personalization and geographic locations. For example, the personalized content may be an advertisement as previously discussed. The author may indicate that an particular advertisement be included in a web page provided to a user accessing the web page from a client device located at a particular geographic location. For example, a metadata associated with the advertisement may indicate to include the advertisement if the location of the client device corresponds to a location defined by the author. To this end, the author may access a segment editor service being implemented on the web server device to define one or more segments and associate the segments with content. For example, the segment editor service provides for the author to define segments for each content available to be included in a web page. A segment may correspond to a listing of user-specific characteristics for personalizing the web pages provided to the user. For example, the segment for each content may correspond to user-specific characteristics such as interests, purchasing histories, consuming patterns and/or other characteristics. Additionally, the segment may also correspond to a geographic location associated with the user. For instance, the geographic location associated with the user may correspond to the location of the client device from which the user accesses the web page.

Having defined the segments for the content to be included in the web page, the author may then simulate the web pages as they would appear from the end user perspective. To this end, a simulation application being implemented on the author device being operated by the author simulates the web page for the author to preview the personalized content. In one embodiment, the author may wish to preview the personalized content generated based on the associations between the segments and the content. Previewing the personalized content allows the author to verify, adjust, remove, and/or otherwise modify the personalization. For example, the author may indicate one or more geographic locations via a user interface rendered on a display associated with an author device. Additionally, the author may indicate other user-specific characteristics via the user interface. In response, the simulation application identifies the segments based on the indicated user-specific characteristics and determines the content to be included in the personalized web page. The web page including the personalized content is then rendered on the display of the author device.

These illustrative examples are given to introduce the reader to the general subject matter discussed here and are not intended to limit the scope of the disclosed concepts. The following sections describe various additional embodiments and examples with reference to the drawings in which like numerals indicate like elements.

FIG. 1 depicts an exemplary computing environment for performing searches based on search criteria as described herein. The methods and systems disclosed herein are also applicable on other computing systems and environments. The environment shown in FIG. 1 includes a wired or wireless network 113 connecting various devices 103, 106, and 109. In one embodiment, the network 113 includes the Internet. In other embodiments, other networks, intranets, or combinations of networks may be used. Alternative configurations are possible.

As used herein, the term "device" refers to any computing or other electronic equipment that executes instructions and includes any type of processor-based equipment that operates an operating system or otherwise executes instructions. A device will typically include a processor that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tablets, laptop computers, Internet appliances, other processor-based devices, and television viewing devices. Exemplary devices 103 and 106 are respectively used as special purpose computing devices to provide specific functionality offered by their respective applications and by the interaction between their applications. As an example, client device 103 is shown with a display 114 and various input/output devices 116. Additionally, author device 106 is shown with a display 115 and various input/output devices 117. A bus, such as bus 119 and bus 120, will typically be included in a device as well. Additionally, a bus such as bus 121 will also typically be included on the server device 109.

As used herein, the term "application" refers to any program instructions or other functional components that execute on a device. An application may reside in the memory of a device that executes the application. As is known to one of skill in the art, such applications may be resident in any suitable computer-readable medium and execute on any suitable processor. For example, as shown the devices 103, 106, and 109 each have a computer-readable medium such as memory 123, 126 and 129 coupled to a processors 133, 136, and 139 that execute computer-executable program instructions and/or accesses stored information. Such processors 133, 136 and 139 may comprise a microprocessor, an ASIC, a state machine, or other processor, and can be any of a number of computer processors. Such processors include, or may be in communication with, a computer-readable medium which stores instructions that, when executed by the processor, cause the processor to perform the steps described herein.

As used herein, the term "service" refers to an application that listens for or otherwise waits for requests or a device that provides one or more such applications that listens for or otherwise waits for requests. Server device 109 is an example of a device implementing a service. A "server device" may be used to provide content 143 via web pages to devices such as the client device 103 and the author device 106. For example, the server device 109 may include a segment editor service 146.

A computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

In FIG. 1, client device 103 includes a memory 123 that includes a browser 153 and/or other components. The browser 153 may render a user interface 156 on the display 114. In one embodiment, the user interface 156 may include one or more web pages provided by the server device 109 that include personalized content 143. For example, the content 143 may be personalized based at least in part on user-specific characteristics such as, a geographic location of the user.

The author device 106 includes a memory 126 that includes an author application 159, a simulation application 149 and/or other components. The author application 159 may be a browser that renders a user interface 156 on the display 115. The simulation application 149 may be received by the author device 106 from the server device 109 and is configured to simulate, for the author on the author device 106, content 143 included on web pages provided by the server device 109 from a perspective of an end user accessing the web pages from a client device 103. For example, the author may desire to preview the personalized web pages that will be dynamically generated by the server device 109. Simulating the personalized web pages to preview the personalized content 143 allows the author to modify, review, and/or otherwise assess the degree of personalization of the web pages. In one embodiment, the author may simulate the dynamic web pages provided by the server device 109 from the author device 106. For example, the author may provide a simulation location 163 via the user interface 156. In response, the simulation application 149 simulates a personalized web page based at least in part on the simulation location 163. The simulation application 149 then provides the web page with personalized content 143 to the author application 159 that is then rendered on the display 115 of the author device 106.

The server device 109 includes a memory 129 that includes one or more segments 166, content 143, the segment editor service 146, and/or other components. In one embodiment, the segments 166 correspond to one or more user-specific characteristics associated with users that access the web pages provided by the server device 109. For example, each segment 166 may include one or more traits that correspond to a respective user-specific characteristic. The user-specific characteristic may be an age, a gender, a pattern of purchasing items, a pattern of consuming content, and/or other characteristics associated with a user. Additionally, the segment also includes a location 169 that may be specific to the user. For example, the location 169 may correspond to the location of the client device 103 from which the user access the server device 109. Additionally, the location 169 may correspond to a home address, a work address, an alternate address, and/or some other location associated with the user. The location 169 may be a name of a city, a name of a country, a set of coordinates, and/or some other indicator of a location. In one embodiment, the segments 166 may also include traits that are associated with the location 169. For example, a season, a population density, an elevation, and a time of day are all associated with the location 169. As other examples, weather, sporting events, cultural events, historical events, and the like may also be associated with the location 169. Additionally, the content 143 may be electronic content such as advertisements, media, documents, and/or other forms of electronic content.

The segment editor service 146 provides for the author to associate segments 166 with content 143. In one embodiment, the segment editor service 146 may provide a user interface 156 that is rendered on the display 115 of the author device 106. The author may then provide one or more segments 166 via the user interface 156. For example, the author may provide keywords, unique identifiers, formulas, and/or otherwise indicate the segments 166. As an example, the author may provide a formula to define a segment 166 that corresponds to an age, a keyword to define a segment 166 that corresponds to a season, and/or a unique identifier to define a segment 166 that corresponds to a gender.

Additionally, the author may provide segments 166 that correspond to a location 169. For instance, the author may indicate a location 169 by providing geographical coordinates, a range of geographical coordinates, names of cities, countries, regions and/or other geographical identifiers, and/or otherwise indicate the location 169. As another example, the author may indicate the location 169 via a map rendered on the display 115. In this example, one or more pins may be placed on the map indicating the location 169. In another embodiment, the author may also provide segments 166 that are associated with a location 169 as discussed above. For example, the author may provide segments 166 such as a season, a population density, an elevation, weather, time, and/or any other segment 166 associated with a location 169, as described above.

Having provided the segments 166, the author then associates the segments 166 with content 143. In one embodiment, the author may identify content 143 previously stored in the memory 129 of the server device 109. In this embodiment, the author may access the previously stored content 143 via the user interface 156 and associate the segments 166 with the previously stored content 143. For example, the content 143 may be associated with one or more segments 166, as discussed above. In another embodiment, the author may provide new content 143 to be stored in the memory 129 of the server device 109. In this embodiment, the author may provide the new content 143 via the user interface 156 and associate the segments 166 with the new content 143. The segments 166 may be stored in a metadata of the content 143 to indicate an association between the segments 166 and the content 143. For example, the author may draw the association to create personalized content 143 for users associated with a specific location 169. As an example, the personalized content 143 may include advertisements for sporting events, cultural events, services, goods, and/or other items based on the user's location 169.

Additionally, the segment editor service 146 may also enable the author to edit, remove, and/or otherwise manipulate previously associated segments 166. For example, the author may access previously stored content 143 and the segments 166 associated with the previously stored content 143 via the user interface 156. The author may then add new segments 166, modify existing segments 166, and/or otherwise manipulate the previously defined segments 166 associated with the previously stored content 143. For example, the author may add a location 169 to the previously defined segments 166.

The author on the author device 106 may then wish to simulate content 143 included on web pages provided by the server device 109 from a perspective of an end user accessing the web pages from a client device 103. For example, the author may desire to preview the personalized web pages that will be dynamically generated by the server device 109. In one embodiment, the author may manipulate the user interface 156 rendered on the display 115 of the author device to a request the simulation application 149 to simulate a web page. For example, the author may identify the web page to be simulated and indicate the segments 166 from which to personalize the web page. In one embodiment, one of the segments 166 indicated by the author may be the simulation location 163 and/or a segment 166 associated with the simulation location 163. In response, the simulation application 149 provides a web page that is personalized based on the segments 166 indicated by the author. For example, the web page includes personalized content 143 based on the segments 166 indicated by the user, such as the simulation location 163. The author may preview the web page containing personalized content 143 based on the indicated segments 166 and make any adjustments, if necessary. Upon previewing, the author may transmit a request to the segment editor service 146 to edit segments 166 associated for that particular web page, modify the content 143 associated with the segments 166, and/or otherwise adjust the personalized content 143 of the web page.

Figure 2:
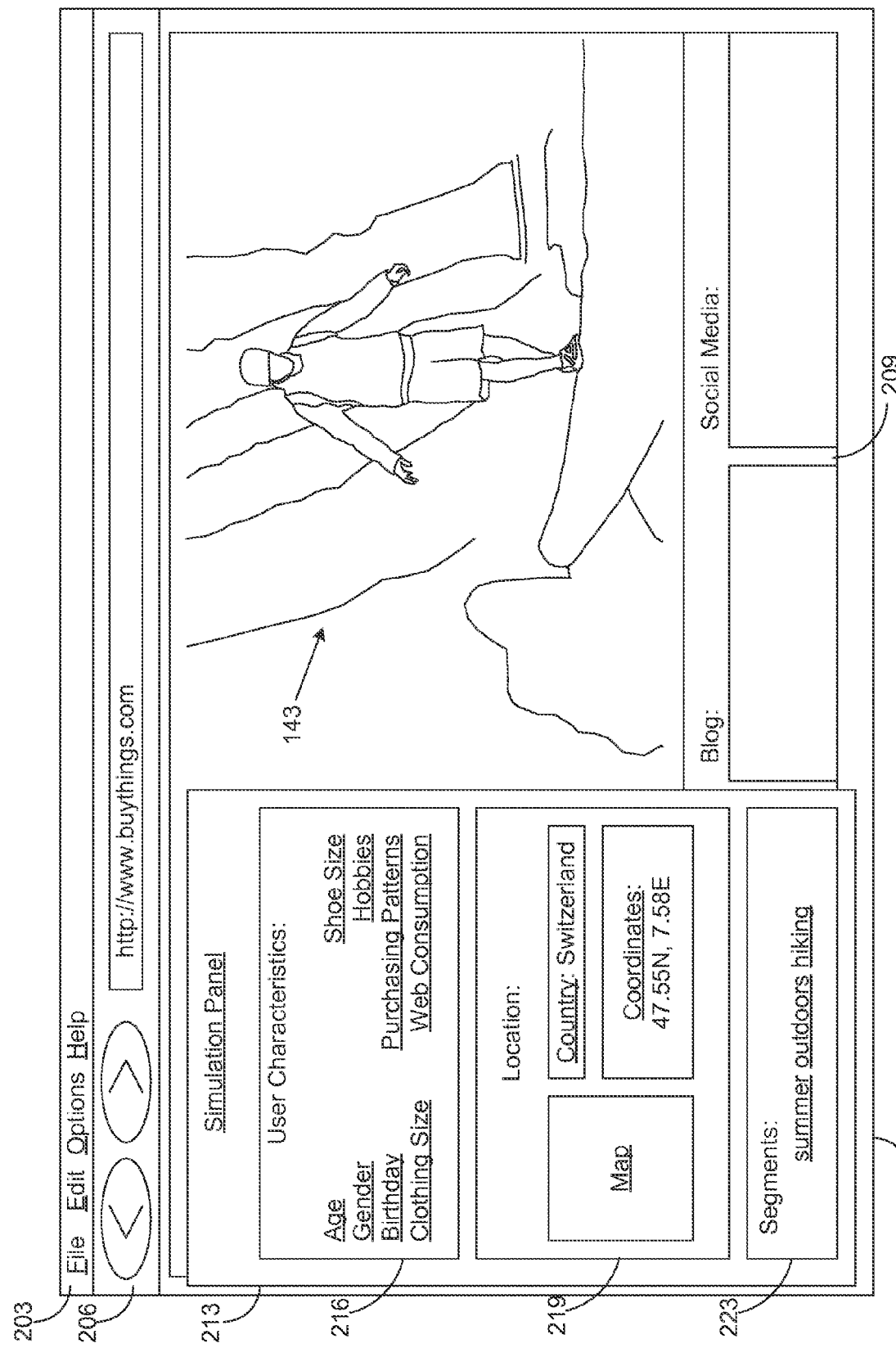
FIG. 2 is an exemplary embodiment of a first user interface rendered on a display associated with an author device.

FIG. 2 illustrates one embodiment of a user interface 156, depicted herein as user interface 156a, according to certain embodiments of the present disclosure, that is rendered on the display 115 (FIG. 1) of the author device 106 (FIG. 1). In this example, the user interface 156a depicts browser 203 with a navigation panel 206 and a web page 209 with personalized content 143. Additionally, the user interface 156a depicts a simulation panel 213. As shown here, the simulation panel 213 includes a user characteristics box 216, a location box 219 and a segments box 223.

In one embodiment, the web page 209 may be associated with an electronic commerce service that provides, to end users, one or more items available for purchase. Additionally, the web page 209 may be associated with other services such as news, streaming media, games, electronic discussion boards, and/or any other type of electronic service. In this example, the web page 209 represents a simulation to an author from the perspective of a user on a client device 103 (FIG. 1). For instance, the web page 209 is rendered on the display 115 (FIG. 1) of the author device 106 (FIG. 1). The web page 209 includes includes a variety of components such as a blog portion, a social media portion, personalized content 134, and/or other components. For instance, the blog portion may include one or more electronic logs that provide a variety of information such as sales promotions, customer stories, announcements, and/or other information. The social media portion may include one or more postings from a social media platform. Additionally, the web page 209 may depict a marketing campaign to promote the purchase of one or more items. For example, the campaign includes personalized content 143 in the form of advertisements, teasers, and/or other promotions targeted for a specific user. The personalized content 143 to include in the web page 209 is based at least in part on segments 166 (FIG. 1) such as a location 169 (FIG. 1) associated with the user, as discussed above. For example, the segments 166 may be determined from a user profile accessible to the server device 109. The web server device 109 may identify content 143 with which to personalize the web page 209 from the determined segments 166. In this example, the user may be a male that enjoys outdoor activities. Accordingly, the personalized content 143 may be directed towards men's clothing for outdoor activities such as hiking.

The simulation panel 213 may be provided by the simulation application 149 (FIG. 1) and rendered on top of the web page 209. In one embodiment, the web page 209 provided by the server device 109 may include the simulation application 149 as an embedded executable and/or the server device 109 provides the simulation application 149 to the author device 106 in another manner. The simulation application 149 may then be invoked via the user interface 156 and/or one of the I/O devices 117 of the author device 106. In response, the simulation panel 213 may appear as a pop-window and/or some other manner to distinguish the panel from the web page 209. The simulation panel 213 is available to the author for simulating the personalized content 143 included in the web page 209 for a variety of end users. In this example, the simulation panel 213 includes a user characteristics box 216 that allows the author to select and/or define various user characteristics for simulation. For instance, the user characteristics box 216 may include one or more selectable hyperlinks for defining the user characteristics. As shown in FIG. 2, the selectable hyperlinks in the user characteristics box 216 includes age, gender, birthday, clothing size, shoe size, hobbies, purchasing patterns, web consumption, and/or any other user characteristic. Additionally, the simulation panel 213 also includes the location box 219 for the author to indicate a simulation location 163 (FIG. 1). In one embodiment, the author may indicate the simulation location 163 via a map and/or input the simulation location 163 by specifying geographical coordinates, a country, a city, a region, and/or other geographical designation. Additionally, in another embodiment, the location box 219 may be a part of the user characteristics box 216.

The simulation panel 213 also includes a segments box 223 for the author to provide one or more segments 166 to perform the simulation. In one embodiment, the segments box 223 may include one or more segments 166 based on the user characteristics indicated by the author in the user characteristics box 216. For example, the segments box 223 may be dynamically populated with segments 166 while the author defines the user characteristics in the user characteristics box 216. In one embodiment, the segments 166 may be generated by the segment editor service 146 based on previously defined parameters for each segment 166. For example, the author may have previously defined an "outdoors" segment 166 and a "hiking" segment 166 as being associated with one or more keywords. The segment editor service 146 may search for the one or more keywords in the hobbies component of the user characteristics to determine whether the user is interested in outdoor activities such as hiking. If the segment editor service 146 identifies the one or more keywords, then the segment editor service 146 may populate the segments box 223 with the "outdoors" and "hiking" segments 166.

Additionally, the author may have previously defined one or more segments 166 based on a location 169 (FIG. 1). For example, the segments 166 based on the location 169 may be names of specific geographic locations such as countries, cities, and/or other geographic identifiers. Additionally, the segments 166 may also be attributes associated with the location 169. For example, these attributes may be related to a season, weather, time, elevation, sporting events, cultural events, and/or other attributes as discussed above. In this example, the author may have previously defined the "summer" segment 166 to be based on a location 169 and a time of the year. For instance, the "summer" segment 166 may be defined by a formula indicating that any location north of the equator between the months of May-September corresponds to the "summer" segment 166. Accordingly, when the author indicates the simulation location 163 in the location box 219 to be "Switzerland," or provides geographical coordinates that correspond to "Switzerland," the segment editor service 146 applies the previously defined formula and populates the segments box 223 with "summer" as one of the segments 166.

The simulation application 149 may receive the parameters of the simulation provided by the author via the simulation panel 213 and provide a web page that includes personalized content 143 corresponding to the simulation parameters. For instance, the simulation application 149 provides a web page 209 that includes personalized content 143 based on the segments 166 appearing in the segments box 223. In one embodiment, the simulation application 149 modifies the personalized content 143 dynamically as the author adjusts the segments 166 in the segments box 223. For example, the web page 209 may be refreshed with personalized content 143 as the author adjusts the segments 166. The personalized content 143 may have been previously received from the server device 109 (FIG. 1) in conjunction with the web page. In one embodiment, the simulation application 149 may identify the personalized content 143 to include in the simulated web page by selecting from the previously received content stored in the memory 126 (FIG. 1) of the author device 106. Dynamically adjusting the personalized content 143 allows the author to preview the effect of each segment 166 in the segments box 223 and preview the varying combinations of the segments 166 in the segments box 223 by forgoing repeated page loads.

Figure 3:
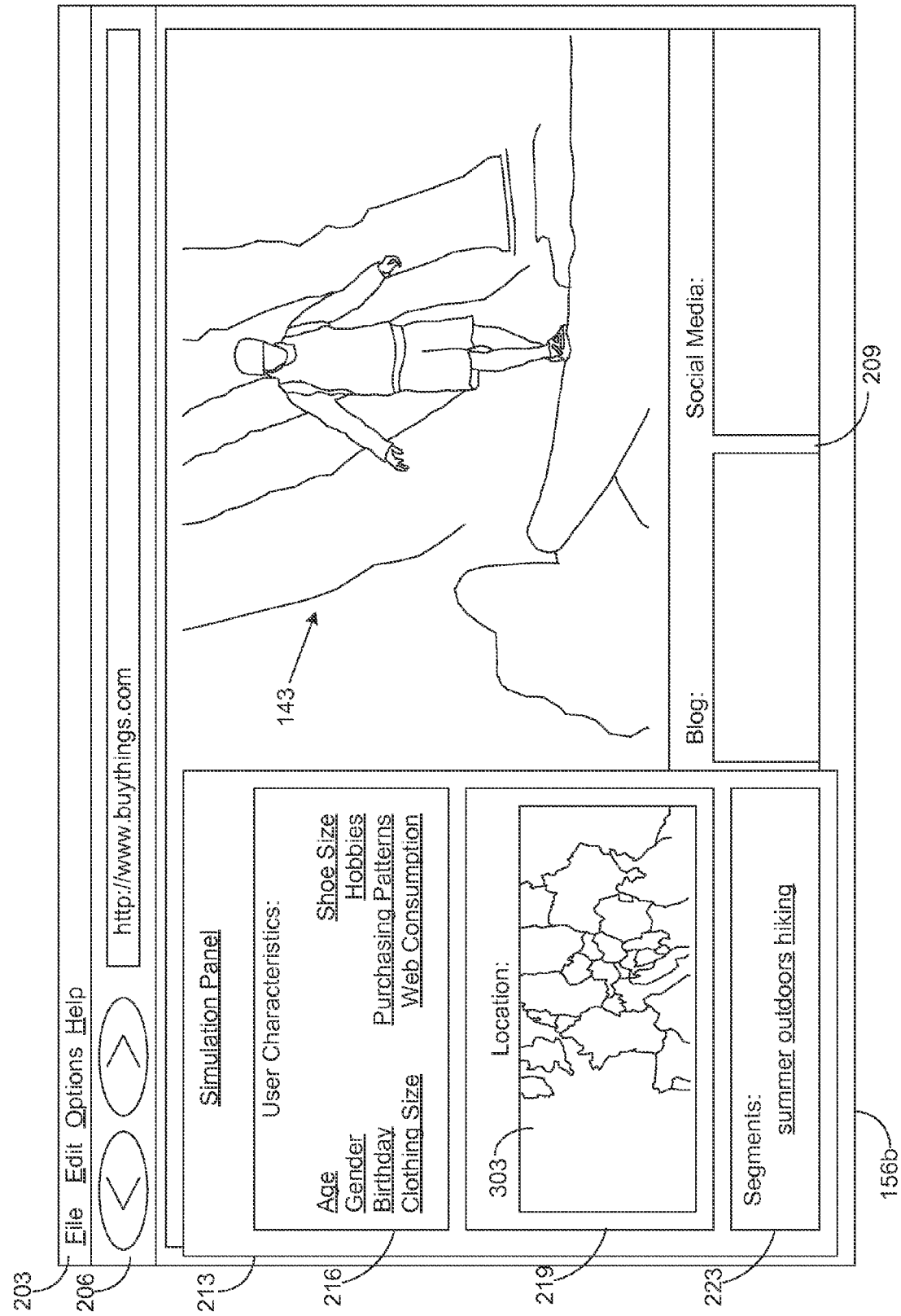
FIG. 3 is an exemplary embodiment of a second user interface rendered on the display associated with the author device.

FIG. 3 illustrates one embodiment of a user interface 156, depicted herein as user interface 156*b*, according to certain embodiments of the present disclosure, that is rendered on the display 115 (FIG. 1) of the author device 106 (FIG. 1). In this example, the user interface 156*b* depicts a browser 203 with a navigation panel 206 and a web page 209 with personalized content 143. Additionally, the user interface 156*b* depicts a simulation panel 213. As shown here, the simulation panel 213 includes a user characteristics box 216, a location box 219 and a segments box 223, as described above with respect to FIG. 2.

As shown in FIG. 3, the location box 219 depicts a map 303 for the author to indicate a simulation location 163 (FIG. 1). In one embodiment, the author may drop a pin and/or other marker onto the map 303 to indicate the simulation location 163. The segment editor service 146 (FIG. 1) populates the segments 166 (FIG. 1) in the segments box 223 based at least in part on the simulation location 163, as described above. The simulation application 149 (FIG. 1) then simulates the web page 209 by refreshing the personalized content 143 portion of the web page 209 based on the segments 166 of the segments box 223, as described above. For example, the simulation application 149 may refresh the web page 209 with personalized content 143 stored in the memory 126 (FIG. 1) of the author device 106 by selecting the content that corresponds with the segments 166 of the segments box 223.

Figure 4:
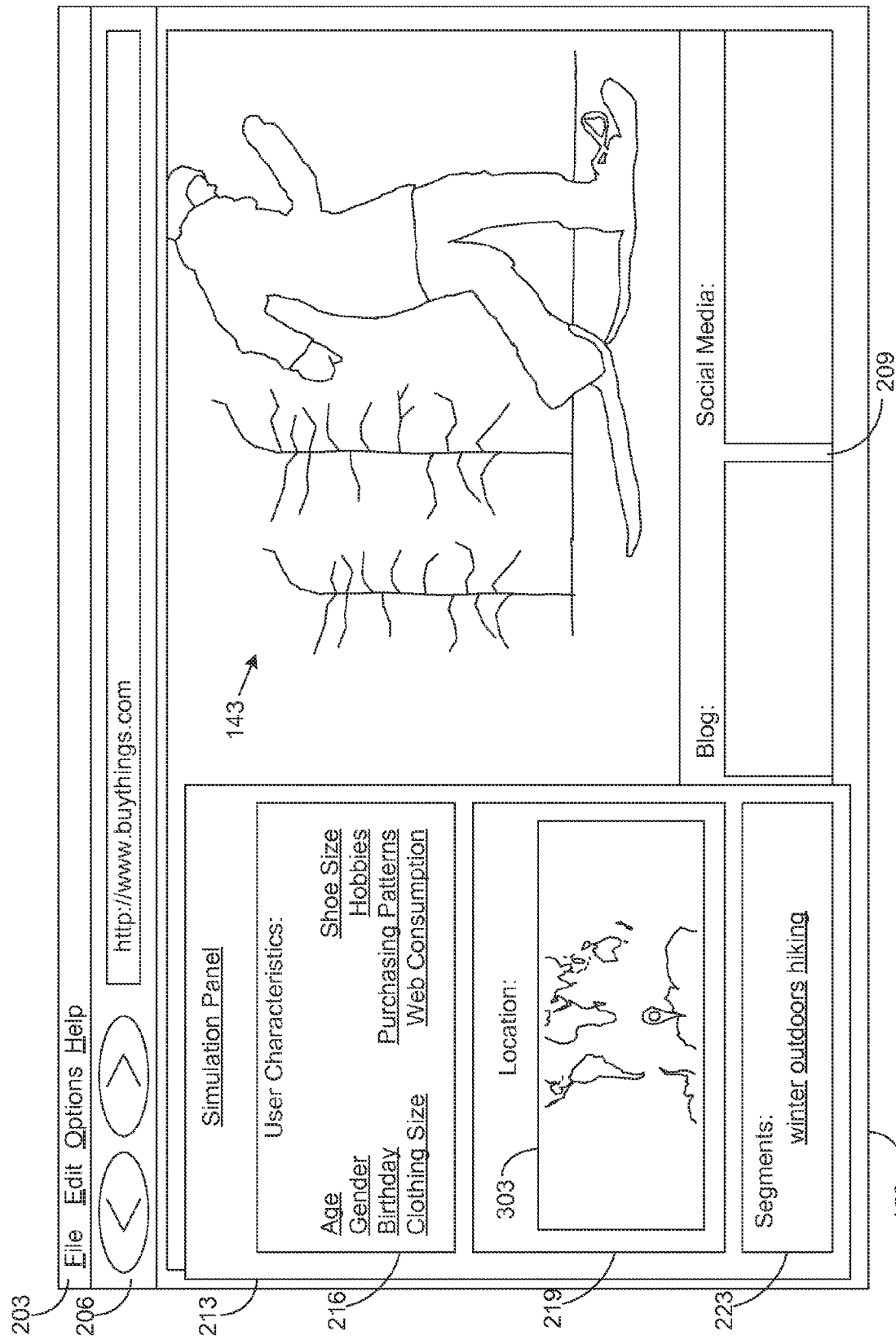
FIG. 4 is an exemplary embodiment of a third user interface rendered on the display associated with the author device.

FIG. 4 illustrates one embodiment of a user interface 156, depicted herein as user interface 156*c*, according to certain embodiments of the present disclosure, that is rendered on the display 115 (FIG. 1) of the author device 106 (FIG. 1). In this example, the user interface 156*c* depicts a browser 203 with a navigation panel 206 and a web page 209 with personalized content 143. Additionally, the user interface 156*c* depicts a simulation panel 213. As shown here, the simulation panel 213 includes a user characteristics box 216, a location box 219 and a segments box 223, as described above with respect to FIG. 2.

As shown in FIG. 4, the location box 219 depicts a map 303 for the author to indicate a simulation location 163 (FIG. 1). Here, the author selected Antarctica as the simulation location 163. In response, the segment editor service 146 (FIG. 1) populates the segments 166 (FIG. 1) in the segments box 223 based at least in part on the simulation location 163. For example, the author may have previously indicated that "winter" is a segment 166 and defined "winter" by a formula, as described above. The formula may indicate that any location south of the equator between the months of May-September corresponds to the "winter" segment 166. The simulation application 149 (FIG. 1) then simulates the web page 209 by refreshing the personalized content 143 portion of the web page 209 based at least in part on the segments 166 of the segments box 223, as described above. For instance, content 143 may have been previously received from the server device 109 (FIG. 1) and stored in the memory 126 (FIG. 1) of the author device 106 (FIG. 1). The simulation application 149 may select personalized content 143 that corresponds with the segments 166 of the segments box 223 from the memory 126. In this example, the personalized content 143 is associated with the segments "winter," "outdoors," and "hiking." The author may have previously associated these segments 166 with the personalized content 143 depicted in FIG. 4. For example, the personalized content 143 associated with these segments 166 may be a marketing campaign for outdoor winter hiking equipment such as coats, gloves, snow shoes, and the like. Additionally, the personalized content 143 of web page 209 may change dynamically when the author places the pin and/or other marker on the map 303 on Antarctica to allow the author to quickly preview the effect of the simulation location 163. In one embodiment, the information in the blog portion and the social media portion may also be adjusted when the author adjusts one or more user characteristics in the user characteristics box 216, the simulation location 163 in the location box 219, and/or a segment 166 in the segments box 223.

Figure 5:
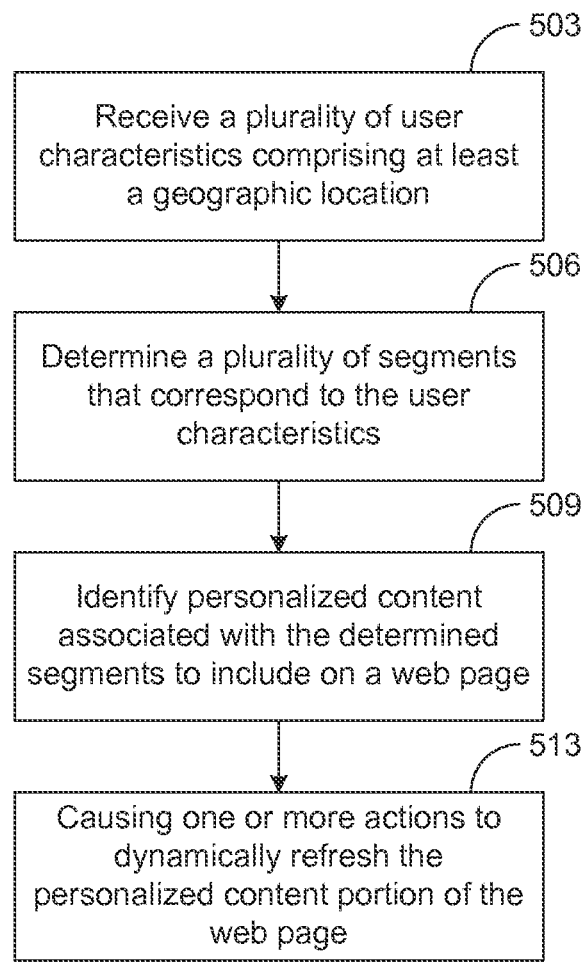
FIG. 5 is a flow chart illustrating an exemplary method simulating personalized content on a web page based at least in part on user characteristics.

FIG. 5 is a flowchart that provides one example of the operation of a portion of the system described herein. It is understood that the flowchart of FIG. 5 provides merely an example of the many different types of functional arrangements that may be employed to implement the operation of the portion of the system as described herein. As an alternative, the flowchart of FIG. 5 may be viewed as depicting an example of steps of a method implemented by the system described herein according to one or more embodiments.

Beginning with step 503, a simulation application 149 (FIG. 1) receives a plurality of user characteristics comprising at least a geographic location such as a simulation location 163 (FIG. 1). In one embodiment, an author on the author device 106 may wish to simulate a web page to include personalized content 143 based at least in part on the user characteristics. To this end, the author may indicate the user characteristics in a user characteristics box 216 (FIG. 2) and the simulation location 163 in the location box 219 (FIG. 2).

Next, in step 506, the simulation application 149 determines a plurality of segments 166 that correspond to the received user characteristics. For example, the author may have previously defined the segments 166 based on a formula and/or keywords via the segment editor service 146 (FIG. 1), as described above. Each segment 166 may be based on one or more user characteristics. Additionally, at least one segment 166 corresponds to the received geographic location or may be based at least in part on the received geographic location. For example, a segment 166 such as "summer" is based on the geographic location and a time of year, as described above.

In step 509, the simulation application 149 identifies personalized content 143 associated with the determined segments 166. For example, the simulation application 149 may have previously received content 143 from the server device 109 (FIG. 1) in conjunction with the web page served up by the server device 109. The simulation application 149 may identify the personalized content 143 associated with the determined segments 166 that are stored in the memory 126 (FIG. 1). In one embodiment, the author of the web page may have previously associated the segments 166 with content 143. For example, the associated segments 166 may be stored in a metadata associated with the content 143 as indicated by the author. Then, in step 513, the simulation application 149 causes one or more actions to dynamically render the web page that includes the personalized content 143. For example, the personalized content 143 portion of the web page may be refreshed on the display 115 (FIG. 1) associated with the author device 106. In one embodiment, the simulation application 149 cause the personalized content 143 portion of the web page to be refreshed without reloading the web page. The author may then preview the personalized content 143 as discussed above.

Figure 6:
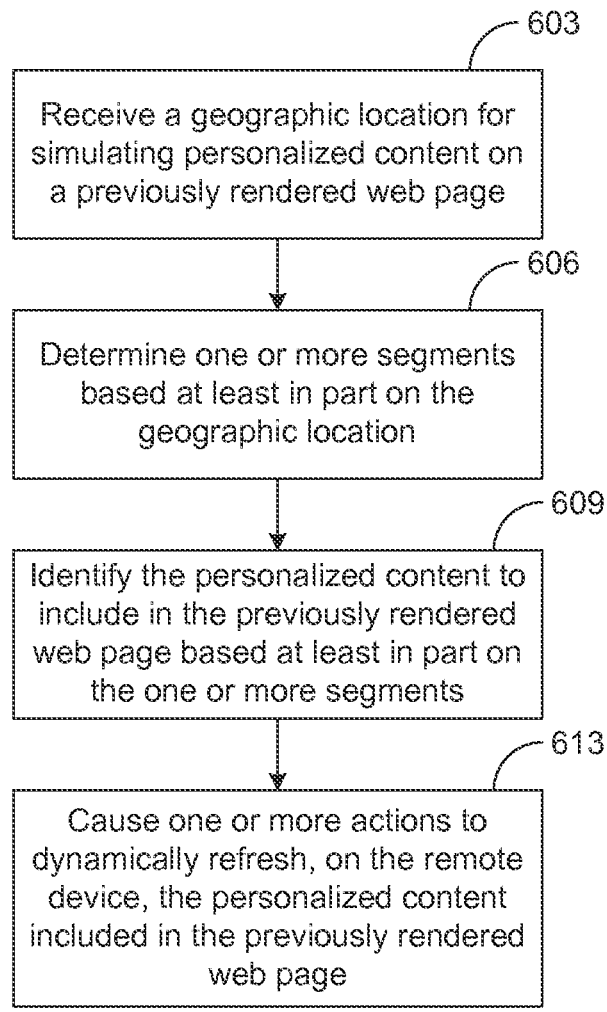
FIG. 6 is a flow chart illustrating an exemplary method for simulating personalized content on a web page based at least in part on a geographic location.

FIG. 6 is a flowchart that provides one example of the operation of a portion of the system described herein. It is understood that the flowchart of FIG. 6 provides merely an example of the many different types of functional arrangements that may be employed to implement the operation of the portion of the system as described herein. As an alternative, the flowchart of FIG. 6 may be viewed as depicting an example of steps of a method implemented by the system described herein according to one or more embodiments.

Beginning with step 603, a simulation application 149 (FIG. 1) receives a geographic location such as a simulation location 163 (FIG. 1) for simulating personalized content 143 (FIG. 1) on a previously rendered web page. In one embodiment, an author on the author device 106 may request to simulate a web page to include personalized content 143 based at least in part on the simulation location 163 via a user interface 156 (FIG. 1) rendered on a display 115 (FIG. 1) of the author device 106. For example, the author may indicate the simulation location 163 on a map included in the location box 219 (FIG. 2).

Next, in step 606, the simulation application 149 determines one or more segments 166 (FIG. 1) based at least in part on the geographic location. For example, the author may have previously defined the segments 166 based on a formula and/or keywords, as described above. At least one segment 166 corresponds to the received geographic location or may be based at least in part on the received geographic location. For example, a segment 166 such as "summer" is based on the geographic location and a time of year, as described above. Additionally, each segment 166 may be based at least in part on the geographic location and one or more user characteristics. Further, the segments 166 and the content 143 may have been previously provided by the server device 109 to the author device 106 in conjunction with the web page and the simulation application 149, as discussed above. In one embodiment, the segments 166, content 143, web page and the simulation application 149 may be stored on the local memory 126 (FIG. 1) of the author device 106 (FIG. 1).

In step 609, the simulation application 149 identifies the personalized content 143 to include in the previously rendered web page based at least in part on the one or more segments 166. In one embodiment, the author of the web page may have previously associated the segments 166 with content 143. For example, the associated segments 166 may be stored in a metadata associated with the content 143 as indicated by the author. Then, in step 613, the simulation application 149 causes one or more actions to dynamically refresh the personalized content 143 portion of the previously rendered web page. For example, the web page rendered on the display 115 (FIG. 1) associated with the author device 106 is refreshed to update the personalized content 143 portion of the web page. In another embodiment, the simulation application 149 may refresh only the personalized content 143 portion of the previously rendered web page. The author may then preview the personalized content 143 as discussed above.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method comprising:
generating a web page, the generated web page having a location-based region for displaying first location-based content associated with first geographic location data and a second region for displaying second location-based content associated with second geographic location data, the generated web page having an additional region for displaying additional content independently of the first geographic location data and the second geographic location data;

creating, with a simulation tool, a first association with the first geographic location data in first metadata of the first location-based content and creating a second association with the second geographic location data in second metadata of the second location-based content; and simulating, with the simulation tool, a display of the web page with both location-based content and the additional content that is independent of the first geographic location data and the second geographic location data, wherein simulating the display comprises:

generating an interface, the interface comprising a preview of the generated web page with the additional content in the additional region, the interface further comprising a location tool for receiving inputs indicative of the first geographic location data and the second geographic location data, during a first time period, using the first metadata to update the preview in the interface to display the first location-based content in the location-based region responsive to receiving a first input via the location tool indicative of the first geographic location data, and during a second time period, using the first metadata to update the preview in the interface to replace the first location-based content with the second location-based content in response to receiving a second input via the location tool indicative of the second geographic location data, wherein the additional content that is displayed independently of the first geographic location data and the second geographic location data comprises content obtained from a first web content provider that is separate from a second web content provider, wherein at least one of the first location-based content or the second location-based content is obtained from the second web content provider in response to receiving at least one of the first input or the second input.

2. The method of claim 1, wherein the first location-based content comprises first content having first subject matter that is associated with both the first geographic location data and a user-specific characteristic for a user accessing the web page;
wherein the second location-based content comprises second content having second subject matter that is associated with both the second geographic location data and the user-specific characteristic.

3. The method of claim 1, further comprising modifying at least one of the first association and the second association in response to a modification request received subsequent to at least one of the first time period and the second time period.

4. The method of claim 3, further comprising embedding the simulation tool in the web page, wherein the location tool and the modification request are generated using the simulation tool.

5. The method of claim 4, wherein the simulation tool provides an additional interface for simulating user-specific characteristics of a user accessing the web page.

6. The method of claim 1, wherein at least one of the first geographic location data and the second geographic location data comprises at least one of:
text content specifying at least one of a name of a geographic region and a geographic coordinate;
an input identifying the geographic region on a map displayed in the interface; and
text content identifying at least one feature specific to the geographic region other than the name of the geographic region and the geographic coordinate.

7. A system comprising:
a processor; and
a non-transitory computer-readable medium communicatively coupled to the processor,
wherein the processor is configured for executing program code stored in the non-transitory computer-readable medium and thereby performing operations comprising:
generating a web page, the generated web page having a location-based region for displaying first location-based content associated with first geographic location data and a second region for displaying second location-based content associated with second geographic location data, the generated web page having an additional region for displaying additional content independently of the first geographic location data and the second geographic location data,
creating, with a simulation tool, a first association with the first geographic location data in first metadata of the first location-based content and creating a second association with the second geographic location data in second metadata of the second location-based content, and
simulating, with the simulation tool, a display of the web page with both location-based content and the additional content that is independent of the first geographic location data and the second geographic location data, wherein simulating the display comprises:
generating an interface, the interface comprising a preview of the generated web page with the additional content in the additional region, the interface further comprising a location tool for receiving inputs indicative of the first geographic location data and the second geographic location data,
during a first time period, using the first metadata to update the preview in the interface to display the first location-based content in the location-based region responsive to receiving a first input via the location tool indicative of the first geographic location data, and
during a second time period, using the first metadata to update the preview in the interface to replace the first location-based content with the second location-based content in response to receiving a second input via the location tool indicative of the second geographic location data.

8. The system of claim 7, wherein the first location-based content comprises first content having first subject matter that is associated with both the first geographic location data and a user-specific characteristic for a user accessing the web page;
wherein the second location-based content comprises second content having second subject matter that is associated with both the second geographic location data and the user-specific characteristic.

9. The system of claim 7, wherein the operations further comprise modifying at least one of the first association and the second association in response to a modification request received subsequent to at least one of the first time period and the second time period.

10. The system of claim 9, wherein the operations further comprise embedding the simulation tool in the web page, wherein the location tool and the modification request are generated using the simulation tool.

11. The system of claim 10, wherein the simulation tool provides an additional interface for simulating user-specific characteristics of a user accessing the web page.

12. The system of claim 7, wherein at least one of the first geographic location data and the second geographic location data comprises at least one of:
text content specifying at least one of a name of a geographic region and a geographic coordinate;
an input identifying the geographic region on a map displayed in the interface; and
text content identifying at least one feature specific to the geographic region other than the name of the geographic region and the geographic coordinate.

13. A non-transitory computer-readable medium having instructions that are executable by a processor, the instructions comprising:
instructions for generating a web page, the generated web page having a location-based region for displaying first location-based content associated with first geographic location data and a second region for displaying second location-based content associated with second geographic location data, the generated web page having an additional region for displaying additional content independently of the first geographic location data and the second geographic location data; and
instructions for creating, with a simulation tool, a first association with the first geographic location data in first metadata of the first location-based content and creating a second association with the second geographic location data in second metadata of the second location-based content; and
instructions for simulating, with the simulation tool, a display of the web page with both location-based content and the additional content that is independent of the first geographic location data and the second geographic location data, wherein simulating the display comprises:
- generating an interface, the interface comprising a preview of the generated web page with the additional content in the additional region, the interface further comprising a location tool for receiving inputs indicative of the first geographic location data and the second geographic location data,
- using, during a first time period, the first metadata to update the preview in the interface to display the first location-based content in the location-based region responsive to receiving a first input via the location tool indicative of the first geographic location data, and
- using, during a second time period, the first metadata to update the preview in the interface to replace the first location-based content with the second location-based content in response to receiving a second input via the location tool indicative of the second geographic location data.

14. The non-transitory computer-readable medium of claim 13, wherein the first location-based content comprises first content having first subject matter that is associated with both the first geographic location data and a user-specific characteristic for a user accessing the web page;
- wherein the second location-based content comprises second content having second subject matter that is associated with both the second geographic location data and the user-specific characteristic.

15. The non-transitory computer-readable medium of claim 13, further comprising instructions for modifying at least one of the first association and the second association in response to a modification request received subsequent to at least one of the first time period and the second time period.

16. The non-transitory computer-readable medium of claim 15, further comprising instructions for embedding the simulation tool in the web page, wherein the location tool and the modification request are generated using the simulation tool.

17. The non-transitory computer-readable medium of claim 16, wherein the simulation tool provides an additional interface for simulating user-specific characteristics of a user accessing the web page.

* * * * *